United States Patent
Barker et al.

(10) Patent No.: US 11,159,027 B2
(45) Date of Patent: Oct. 26, 2021

(54) STORAGE AND/OR TRANSPORTATION OF SODIUM-ION CELLS

(71) Applicant: FARADION LIMITED, Sheffield (GB)

(72) Inventors: Jeremy Barker, Chipping Norton (GB); Christopher John Wright, Oxford (GB)

(73) Assignee: FARADION LIMITED, Sheffield (GB)

( * ) Notice: Subject to any disclaimer, the term of this patent is extended or adjusted under 35 U.S.C. 154(b) by 0 days.

(21) Appl. No.: 15/505,691

(22) PCT Filed: Aug. 18, 2015

(86) PCT No.: PCT/GB2015/052400
§ 371 (c)(1),
(2) Date: Feb. 22, 2017

(87) PCT Pub. No.: WO2016/027082
PCT Pub. Date: Feb. 25, 2016

(65) Prior Publication Data
US 2017/0237270 A1    Aug. 17, 2017

(30) Foreign Application Priority Data
Aug. 22, 2014 (GB) .................................... 1414959

(51) Int. Cl.
*H02J 7/00* (2006.01)
*H01M 10/054* (2010.01)
(Continued)

(52) U.S. Cl.
CPC ......... *H02J 7/0016* (2013.01); *H01M 10/054* (2013.01); *H01M 10/44* (2013.01);
(Continued)

(58) Field of Classification Search
CPC ........... H01M 10/0525; H01M 10/052; H01M 10/4235; H01M 10/054; H01M 10/425;
(Continued)

(56) References Cited

U.S. PATENT DOCUMENTS 5,759,715 A      6/1998  Barker et al.
5,973,497 A *   10/1999  Bergk ................ G01R 31/3835
                                                              324/428
(Continued)

FOREIGN PATENT DOCUMENTS

DE    102010032783 A1   2/2012
JP       2008235260 A   10/2008
(Continued)

OTHER PUBLICATIONS

International Preliminary Report on Patentability, issued by the International Preliminary Examining Authority dated Nov. 17, 2016, Application No. PCT/GB2015/052400, 12 pages.
(Continued)

*Primary Examiner* — David V Henze-Gongola
*Assistant Examiner* — Tarikh Kanem Rankine
(74) *Attorney, Agent, or Firm* — Meunier Carlin & Curfman LLC

(57) ABSTRACT

The invention relates to a process for making sodium-ion cells, particularly sodium-ion cells which are capable of safe storage and/or transportation, comprising the steps: a) constructing a sodium-ion cell comprising a positive electrode, a negative electrode and an electrolyte, optionally performing one more charge/discharge operations on the sodium-ion cell; and b) treating the sodium-ion cell to ensure that it is in a state of charge of from 0% to 20%.

13 Claims, 8 Drawing Sheets

(51) Int. Cl.
*H01M 10/44* (2006.01)
*H01M 10/42* (2006.01)
*H01M 10/052* (2010.01)
*H01M 4/38* (2006.01)
*H01M 10/0525* (2010.01)

(52) U.S. Cl.
CPC ............. *H02J 7/0042* (2013.01); *H01M 4/38* (2013.01); *H01M 10/052* (2013.01); *H01M 10/0525* (2013.01); *H01M 10/4235* (2013.01)

(58) Field of Classification Search
CPC ..... H01M 10/4257; H01M 2010/4271; H01M 2010/4278
USPC .......................... 429/224, 231.1, 223, 218.1
See application file for complete search history.

(56) References Cited

U.S. PATENT DOCUMENTS

| | | | | |
|---|---|---|---|---|
| 2003/0027036 A1* | 2/2003 | Emori | ................. | H01M 2/34 429/61 |
| 2003/0044665 A1* | 3/2003 | Rastegar | ................. | F41H 11/02 429/402 |
| 2008/0213674 A1* | 9/2008 | Okada | ................. | H01M 4/136 429/344 |
| 2011/0104526 A1* | 5/2011 | Boxley | ............... | H01M 2/1646 429/50 |
| 2012/0183837 A1* | 7/2012 | Johnson | ................ | H01M 4/366 429/156 |
| 2013/0244100 A1* | 9/2013 | Tan | ........................ | H01G 11/50 429/199 |
| 2013/0288127 A1 | 10/2013 | Matsumoto et al. | | |
| 2014/0170458 A1* | 6/2014 | Nitta | ................... | H01M 10/399 429/103 |
| 2014/0239905 A1* | 8/2014 | Yamazaki | .............. | H01M 10/44 320/128 |
| 2015/0004488 A1* | 1/2015 | Abdelsalam | ............ | H01M 8/00 429/218.1 |
| 2015/0017322 A1 | 1/2015 | Reynaud et al. | | |
| 2015/0340899 A1* | 11/2015 | Bilezikjian | ........... | H02J 7/0063 320/135 |
| 2016/0226069 A1* | 8/2016 | Yamada | ................. | H01M 4/136 |

FOREIGN PATENT DOCUMENTS

| | | | |
|---|---|---|---|
| JP | 2012079687 A | 4/2012 | |
| JP | 2012257367 A | 12/2012 | |
| JP | 2013054987 A | 3/2013 | |
| WO | 2012/024499 A1 | 2/2012 | |
| WO | 2013128115 A1 | 9/2013 | |
| WO | 2014064988 A1 | 5/2014 | |
| WO | WO-2015037489 A1 * | 3/2015 | ............ H01M 4/136 |

OTHER PUBLICATIONS

International Search Report and Written Opinion, issued by the International Searching Authority dated Nov. 25, 2015, Application No. PCT/GB2015/052400, 13 pages.
Search Report, issued by the United Kingdom Intellectual Property Office dated Apr. 28, 2015, Application No. GB1414959.5, 4 pages.
Kuze, Satoru, et al. "Development of a sodium ion secondary battery." Sumitomo Kagaku 2013 (2013): 1-13.
English Translation of Office Action issued in Chinese Application No. 201580045267.5 dated Jan. 11, 2019.
Communication pursuant to Article 94(3) EPC issued in EP 15756207.5, dated May 20, 2019.
English Translation of Japanese Office Action issued in corresponding JP 2017-529157 dated Jun. 11, 2019.
EP Examination Report issued in EP 15756207.5, dated Apr. 9, 2020.
Summary of Office Action issued in JP 2017-529157, dated Feb. 4, 2020.
Kuze, et al., "Development of a Sodium Ion Secondary Battery", Sumitomo Kagaku, 2013, pp. 1-13.
Final Office Action in connection to South Korean Patent App No. KR10-2017-7007720, dated Mar. 25, 2021.
Office Action relating to KR Application No. 10-2017-7007720, dated Nov. 25, 2020.

* cited by examiner

STORAGE AND/OR TRANSPORTATION OF SODIUM-ION CELLS

FIELD OF THE INVENTION

The present invention relates to a process for making sodium-ion cells, for example rechargeable sodium-ion cells, which are capable of being safely transported and/or stored, particularly for medium to long time periods. The invention also relates to energy storage devices that comprise one or more of these sodium-ion cells, such energy storage devices include for example, batteries, battery modules, battery packs, electrochemical devices and electrochromic devices.

BACKGROUND OF THE INVENTION

Sodium-ion batteries are analogous in many ways to the lithium-ion batteries that are in common use today; they are both reusable secondary batteries that comprise an anode (negative electrode), a cathode (positive electrode) and an electrolyte material, both are capable of storing energy, and they both charge and discharge via a similar reaction mechanism. When a sodium-ion (or lithium-ion) battery is charging, $Na^+$ (or $Li^+$) ions de-intercalate from the cathode and insert into the anode. Meanwhile charge balancing electrons pass from the cathode through the external circuit containing the charger and into the anode of the battery. During discharge the same process occurs but in the opposite direction.

Lithium-ion battery technology has enjoyed a lot of attention in recent years and provides the preferred portable battery for most electronic devices in use today; however lithium is not a cheap metal to source and is considered too expensive for use in large scale applications. By contrast sodium-ion battery technology is still in its relative infancy but is seen as advantageous; sodium is much more abundant than lithium and some researchers predict this will provide a cheaper and more durable way to store energy into the future, particularly for large scale applications such as storing energy on the electrical grid. Nevertheless a lot of work has yet to be done before sodium-ion batteries are a commercial reality.

Sodium-ion and lithium-ion rechargeable (also known as "secondary") batteries are both made up of a number of cells which typically contain a cathode (a positive electrode) which comprises a positive electrode material and a positive electrode current collector, and an anode (a negative electrode) which comprises a negative electrode material and a negative electrode current collector. In the case of a conventional lithium-ion secondary battery cell, the negative electrode material comprises a carbon material (such as graphite or hard carbon) or silicon, and the negative electrode current collector typically comprises copper. The positive electrode material typically comprises a metal oxide material and the positive electrode current collector typically comprises aluminium or an aluminium alloy. However, problems occur when such cells are either i) stored in a fully discharged state; or ii) cycled down to 0 Volts or close to 0 Volts, because dissolution of copper occurs from the negative (anode) electrode current collector and this leads to a decrease in the discharge capacity of the lithium ion electrode which in turn shortens the cycle length of the lithium-ion battery. Unfortunately, attempts to eliminate this problem by using aluminium in place of copper in the negative current collector have also been unsuccessful as this leads to alloying reactions between the lithium in the cell and the aluminium, particularly again when the cell is in a fully discharged state or cycled down to 0 Volts or close to 0 Volts. An alternative approach has been to use negative (anode) electrode materials that operate at a sufficiently high potential versus lithium for the lithium not to alloy with the aluminium but there is only a limited range of negative electrode materials that are currently known to be capable of this, for example $Li_4Ti_5O_{12}$. Furthermore, a known disadvantage of lithium titanate batteries is that they have a lower inherent voltage which leads to a lower energy density as compared against conventional lithium-ion batteries.

Therefore, to date, the best known way to handle lithium-ion battery cells is to avoid any storage condition at or close to 0 Volts by ensuring that immediately upon manufacture, the lithium-ion battery is conditioned by a process involving at least two or three charge/discharge cycles, followed by a final charge to at least around 40% stage-of-charge. The cell must then be degassed and finally resealed before it is ready for storage and/or transportation.

The work to eliminate the copper dissolution and aluminium alloying problems has gone some way to enable lithium-ion batteries to be effective commercial products, but it does not address the fundamental problem that the transportation and storage of lithium-ion batteries is inherently hazardous. There are numerous reports of charged lithium-ion batteries producing smoke, extreme heat, catching fire or exploding. Understandably this is of major concern, particularly to airlines, and to reduce these safety concerns, in 2013 the International Civil Aviation Organisation introduced very stringent controls on the bulk air transportation of lithium based cells and implemented rules to control both the size (watt hours rating and amount of lithium) of lithium-ion batteries that are permitted to be transported, as well as the number of batteries allowed in each consignment.

In the case of sodium-ion batteries, R&D Report "Sumitomo Kagaku", vol. 2013 describes an investigation into the thermal stability of coin cells fabricated with hard carbon and metallic sodium, using DSC (differential scanning calorimetry) techniques. By way of background, DSC is a thermo-analytical technique in which the difference in the amount of heat required to increase the temperature of a sample and a reference is measured as a function of temperature. Throughout DSC analysis, the sample and the reference are heated and the aim is to maintain the sample and the reference at the same temperature. When a sample is heated it will undergo a physical transformation (for example a phase transition), and more or less heat will need to flow to it than the reference in order to maintain the sample at the same temperature as the reference. Whether less or more heat flows depends on whether the physical transformation experienced by the sample is exothermic or endothermic. As disclosed in this R&D Report, the hard carbon in the abovementioned coin cells were discharged and made to store sodium ions, then the cells were disassembled and the electrode mixture and electrolyte solutions were recovered. This report states that the coin cells were "discharged" to enable the sodium ions to be stored in the hard carbon, and a person skilled in the art will immediately recognise that the cells being tested were half cells; one needs to "discharge" a Na//hard carbon half-cell to sodiate the hard carbon, whereas one would "charge" a full sodium-ion cell to sodiate the hard carbon anode. The investigations then involved DSC measurements being carried out on the electrode mixture and electrolyte solutions to observe the exothermic activity as compared against analogous electrode and electrolyte solutions obtained for cells containing graphite with lithium stored therein. The workers in this R&D Report demonstrate that the hard carbon containing the sodium ions in sodium metal half cells (sodiated hard carbon) has a superior thermal stability compared against the graphite which contains stored lithium ions, and conclude that this possibly indicates that a sodium-ion secondary battery (full cell), even in a charged state (sodiated), would be safe. However, there is no teaching in this prior art to inform whether the observed superior thermal stability of sodium in sodium metal half cells will also be observed in full sodium-ion cells (i.e. when the anode is fully desodiated) or whether such desodiated full sodium-ion cells are stable for long term storage and/or transportation, or whether full sodium-ion cells are inherently less susceptible to producing smoke, giving out extreme heat, catching fire or exploding. Specifically, there is no disclosure to teach whether full sodium-ion cells that are excessively discharged (i.e. discharged to 0 Volts or substantially 0 Volts, i.e. in the range −0.1 to 1 Volts) and fully desodiated, will be thermally stable. In view of the problems observed when full lithium-ion cells are fully discharged (desodiated) as discussed above, such an outcome for full sodium-ion cells (desodiated) would not be expected.

Further work described in R&D Report "Sumitomo Kagaku", vol. 2013 details that sodium-ion cells comprising a layered oxide cathode and a hard carbon anode are able to be discharged to 0 volts and then recharged and cycled in the range 2.0 to 4.0 Volts without the original discharge capacity of the battery being affected by discharging to 0 Volts. Thus, the Sumitomo workers claim, such a battery is essentially stable against excessive discharging. However, the Sumitomo workers have only established this "stability" in the sense that a single discharge to 0 Volts has no effect on its original charge capacity; there is no disclosure or teaching in this prior art that discharging to 0 Volts has any effect on the overall stability, i.e. the physical stability, of the sodium-ion cell. In particular, there is no indication that discharging to 0 Volts has any bearing on whether a sodium-cell at 0 Volts would be susceptible to producing smoke, giving out extreme heat, catching fire or exploding. Moreover, there is no teaching in this report by Sumitomo that a Na-ion cell that is discharged to 0 Volts until all, or at least substantially all of the charge has dissipated (80% to 100% discharged), would be rendered safe for storage and/or transportation. Furthermore, there is no teaching as to what effect repeatedly discharging to 0 Volts has or what a prolonged period of discharge to 0 Volts has on either the overall (physical) stability of the cell (both when it is at 0 Volts, and when it is recharged to its original charge capacity), or what effect repeated or prolonged discharge to 0 Volts has on the cell's ability to be charged to its original charge capacity. It is also unknown from this prior art whether discharge must be performed at a fast or a slow rate, or indeed whether all or substantially all (80% to 100%) of the charge had in fact been dissipated as a result of the single discharge process they describe; it would be expected that the charge in the cell would not have been fully or substantially fully dissipated without a prolonged discharge, for example in the range −0.1 to 1 Volts, and as Sumitomo do not teach this prolonged discharge, it is unclear the degree of charge that would in fact be remaining in their cells after their discharge process, specifically whether this would be 20% or less.

The aim of the present invention is to provide a method of producing extremely cost effective sodium-ion cells (not half cells) that are capable of being safely transported and/or stored, particularly over a period of many months, without causing any detriment to their original discharge capacity, and ideally without any risk of overheating, catching fire or exploding. It is also the aim to provide sodium-ion cells that can be cycled numerous times between 0 Volts and up to 4.5 Volts, preferably between 0 Volts and up to 4.2 Volts, and particularly preferably between 0 Volts and up to 4.0 Volts, and further preferably between 0 Volts and up to above 4 Volts, without adversely affecting the original discharge capacity of the cell. That is, the present invention seeks to provide sodium-ion cells with improved reversible capacity and capacity-fade on cycling. Further, the present invention seeks to provide energy storage devices which comprise one or more of the sodium-ion cells of the present invention. A still further aim is to provide sodium-ion cells which comprise a positive and/or a negative current collector which is able to utilise impure or household grade materials.

Thus, the present invention provides a process for making a sodium-ion cell which is capable of safe storage and/or transportation, comprising the steps:
a) constructing a sodium-ion cell comprising a positive electrode, a negative electrode and an electrolyte, optionally performing one or more charge/discharge operations on the sodium-ion cell; and
b) treating the sodium-ion cell to ensure that it is in a state of charge of from 0% to 20%.

Preferably, the resulting sodium-ion cell is in a state of charge of from 0% to 10%, further preferably from 0% to 5%. Ideally the process of the present invention provides a sodium-ion cell that is in a state of charge of from 0% to 2%, and a state of charge of 0% is most ideal. Clearly, a sodium-ion cell in a state of charge of 0% describes a fully discharged (de-sodiated) sodium-ion cell.

As explained below, the action involved in "treating the cell" in step b), will depend on whether the sodium-ion cell has previously undergone one or more charge/discharge operations, or whether it is in its "as made" (pristine) condition. Cells are described as "pristine" before they experience electrical charging or discharging.

In the case of a sodium-ion cell that has undergone one or more charge/discharge operations (a previously charged/discharged sodium ion cell), the treatment needed in step b) above to render the sodium-ion cell stable i.e. to enable safe storage and/or transportation, involves: discharging the previously charged/discharged sodium-ion cell in the range −0.1 to 1 Volts; optionally maintaining the cell potential in the range −0.1 to 1 Volts; thereby to cause the change in the sodium-ion cell to be dissipated and to produce a resulting sodium-ion cell in a state of charge of from 0% to 20%. The preferred ranges for the percentage state of charge are as described above.

The preferred discharge voltage/cell potential is in the range—0.1 V to 0.5 V, further preferably—0.1 V to 0.4 V, still further preferably—0.05 V to 0.3 V, particularly preferably—0.01 V to 0.2 V, advantageously—0.01 V to 0.1 V, ideally 0 V to 0.1 V, further ideally 0 V to 0.01 V and most ideally at 0 V.

A desired aim of the present invention is to produce sodium-ion cells that have as low a percentage charge as possible within the range 0% to 20%, and the rate of discharge will influence how efficient the charge loss is (i.e. what percentage of charge remains in the sodium-ion cell) and whether extra discharge steps will be needed to achieve the desired 0% to 20% charge.

What constitutes an appropriate rate of discharge will depend on a number of factors including the cell chemistry, the electrode formulation, the cell design etc. thus a rate of discharge that is too high for one cell may not be so for another. In some cases, the rate of discharge, the C-rate (the discharge current divided by the theoretical current draw under which the sodium-ion cell would deliver its nominal rated capacity in the specified period of hours), which is capable for producing sodium-ion cells with 0% to 20% charge, is C/<1 (this means that a discharge current will discharge the entire sodium-ion cell in less than 1 hour), but more typically, lower discharge rates are preferred and C-rate C/1 would be better, C/5 even better, C/10 better still, C/20 ideal and C/100 the most preferred. As discharge rates decrease, the amount of desodiation from the anode increases and a lower residual charge in the sodium-ion cell is achieved, i.e. the closer the sodium-ion cell will be to 0% charge at the end. Although fast discharge rates of less than one hour may be used in some situations, discharge is more conveniently conducted over a period of 1 hour, further preferably over 5 hours, particularly preferably over 10 hours, advantageously over 20 hours and ideally over 100 hours. Low discharge rates (C/20 or C/100) are more likely to produce a sodium-ion cell with all or practically all of the charge dissipated and are less likely to need the optional step of maintaining the cell potential in the range −0.1 to 1 Volts.

When starting from previously charged sodium-ion cells, performing the discharging step at a rate of C/10 or above (e.g. C/5 or C/1) is expected to leave some residual charge within the cell, and it will be advantageous to perform the optional step of maintaining the cell potential in the range −0.1 to 1 Volts for a period of time, for example from less than 1 minute to more than 100 hours depending on the rate of discharge, until the charge has dissipated to a level of from 0% to 20% charge, preferably from 0% to 10% charge, further preferably from 0% to 5% charge, ideally from 0% to 2% charge and further ideally is at 0% charge.

The step of discharging the sodium-ion cell in the range −0.1 to 1 Volts may be achieved by any suitable means. The fastest way to discharge a sodium-ion cell is to apply a short circuit to a fully or partially charged cell, for example by direct shorting using a metal bar or other material with a very low resistance (e.g. C/<1 or C/<0.1). However, although this method may be appropriate in some circumstances, in most cases it is highly undesirable because it will "jolt" the electrochemistry and lead to non-uniform current distributions which would be likely to cause the cell to polarise and be highly unsafe.

A preferred method of discharging the sodium-ion cell is to draw a constant current at a convenient but reasonable rate, for example C/5, until the cell measures in the range −0.1 to 1 Volts (most ideally 0 Volts), although because the discharge has been conducted at a finite rate it will bounce from the cell voltage. Then, because most of the energy will be dissipated any residual energy that is present can be safely removed by shorting (for example using a low temperature impedance link between the positive and negative electrodes) in order to bring the cell potential to within the range −0.1 to 1 Volts, particularly ideally to 0 Volts, and thereby to achieve a sodium-ion cell with a charge of from 0% to 20%, preferably from 0% to 10%, further preferably from 0% to 5%, ideally from 0% to 2%, and most ideally with 0% charge, as defined above.

"Treating the cell" in step b) of the present invention, in the case where the sodium-ion cell has not been subjected to any charge/discharge operations (i.e. it is a pristine cell), to render it capable of storage and/or transportation, involves maintaining the sodium-ion cell in its pristine, as made and uncharged state (0% charge), whilst the sodium-ion cell is undergoing storage and/or transportation.

The process of the present invention, particularly in its handling of pristine sodium-ion cells, is quite unlike the procedures used for handling pristine lithium-ion cells; as described above, lithium-ion cells must be charged to 40% or more charge as soon as possible after manufacture. Moreover, it is not possible to perform the process of the present invention on lithium-ion cells that have been previously charged due to the copper dissolution and aluminium/lithium alloying reactions that occur when the cell is at −0.1 to 1 Volts.

It is expected that previously-charged/discharged sodium-ion cells will have been subjected to conditioning procedures typically involving two or three charge/discharge cycles followed by degassing, prior to step i) above.

In the case of the process of the present invention that is performed on a pristine sodium-ion cell, the conditioning procedures may be conveniently be performed after the storage and/or transportation of the pristine sodium-ion cell, preferably just prior to use.

In a second embodiment, the present invention provides a sodium-ion cell which is in an uncharged or charge dissipated state, i.e. has a charge of from 0% to 20% charge, preferably from 0% to 10% charge, further preferably from 0% to 5% charge, ideally from 0% to 2% charge, and particularly ideally 0% charge.

In a third embodiment, the present invention provides a sodium-ion cell which is capable of safe storage and/or transportation and has a cell potential of −0.1 to 1 Volts In a fourth embodiment, the present invention provides for the storage and/or transportation of an energy storage device which comprises one or more sodium-ion cells, wherein at least one of the one or more sodium-ion cells is as described above and/or is produced according to the process of the present invention as described above.

In a fifth embodiment, the present invention provides a sodium-ion cell being stored and/or transported at −0.1 to 1 Volts, or in the preferred voltage ranges described above.

In a sixth embodiment, the present invention provides an energy storage device comprising one or more sodium-ion cells at least one of which is in an uncharged or charge dissipated state with from 0% to 20% charge, preferably from 0% to 10% charge, further preferably from 0% to 5% charge, ideally 0% to 2% charge, and particularly ideally at 0% charge.

In a seventh embodiment, the present invention provides an energy storage device comprising one or more sodium-ion cells that are being stored and/or transported at −0.1 to 1 Volts.

In an eighth embodiment, the present invention provides a sodium-ion cell which is capable of safe storage and/or transportation without the risk of overheating, catching fire or exploding, wherein the sodium-ion cell is preferably in a state of charge of from 0% to 20%, or within the preferred ranges described above, and/or the sodium-ion cell is at a charge potential in the range −0.1 to 1 Volts.

In a ninth embodiment, the present invention provides an energy storage device which comprises one or more sodium-ion cells which are capable of being stored and/or transported without the risk of overheating, catching fire or exploding, wherein preferably one or more of the sodium-ion cells is in a state of charge of from 0% to 20%, or within the preferred ranges described above and/or one or more of the sodium-ion cells is at a charge potential in the range −0.1 to 1 Volts.

The energy storage devices of the present invention comprise one or more sodium-ion cells as described above and examples of these energy storage devices include batteries, battery modules, battery packs electrochemical devices and electrochromic devices. In a preferred energy storage device according to the present invention, some or all of these one or more sodium-ion cells are connected in series.

Preferably, the present invention according to any of the above embodiments also provides sodium-ion cells and/or energy storage devices which comprise a removable shorting device, for example between the cathode and anode electrodes, in at least one of the one or more of the sodium-ion cells. The shorting device will conveniently provide a physical and/or electrical short (a low impedance or low resistance connection which provides electrical conductivity) between the cathode and anode electrodes, to ensure that the amount of electrical energy in one or more of the sodium-ion cells is maintained at 0 to 20% (or less as defined in the preferred ranges described above), i.e the cell is in a very safe condition, whilst the sodium-ion cell or energy storage device is being stored and/or transported. Preferably the shorting device is easily removable, perhaps by at least a portion of the shorting device being external to the sodium-ion cell or energy storage device, so that the shorting device may be removed from the sodium-ion cell or energy storage device prior to use. In a preferred format the shorting device will be located outside the cell housing or packaging and is a low impedance/resistance short between positive and negative tabs which in turn are connected to the positive and negative electrodes inside the housing or packaging. Removal of the shorting device includes any procedure that involves breaking the connection between the cathode and anode electrodes, thus removal of the shorting device does not need to involve physically removing the shorting device from the sodium-ion cell, or energy storage device, and in an alternative arrangement, the connection between the electrodes may be broken without physically removing the shorting device from the sodium-ion cell or energy storage device. Further, it is envisaged that in energy storage devices, either some or all of the individual sodium-ion cells used therein may be shorted, or alternatively, the entire energy storage device may be shorted. It is also envisaged that the removable shorting device may be reused to short a sodium-ion cell/energy storage device more than once, or it may be reused to short other sodium-ion cells or energy storage devices. The removable shorting device may be provided by any convenient means such as a shorting tab, or a conductive gel or other conductive material which, for example, provides a connection between anode and cathode electrodes in one or more of the sodium-ion cells.

A benefit of the sodium-ion cells of the present invention, i.e. which have a charge of from 0% to 20% (or less as defined in the ranges described above), is that they are stable for a prolonged period of time, for example for at least 8 hours, preferably at least 12 hours, preferably at least 72 hours, but also for at least 6 months. Surprisingly, the sodium-ion cells of the present invention suffer no detriment at all by such prolonged storage and they are able to be charged to the conventional or expected charge capacity of the cell; this is generally about 4.0 to 4.3 Volts. Such findings are of course of high commercial importance since it means that sodium-ion cells are capable of being made stable by the methods of the present invention, and are therefore able to be transported and/or stored individually or in bulk for prolonged periods of time without the same risks of fire and explosion that are associated with lithium-ion batteries. Moreover, the life expectancy of sodium-ion cells is expected to be higher than for lithium-ion cells as a result of the ability of sodium-ion cells to withstand discharging to from −0.1 to 1 Volts without affecting the conventional charge capacity.

A further benefit of the sodium-ion cells of the present invention is that following the period of prolonged storage and charging to their conventional charge capacity (generally about 4.0 or 4.3 Volts, preferably up to 4.5 Volts), the cells are able to be repeatedly cycled from 0 Volts to their conventional charge capacity, for example indefinitely or at least in excess of 100 times or at least in excess of 20 times, again without causing any detriment whatsoever to the conventional charge capacity of the cells. Moreover, cycling from 0 Volts to about 4.0 or 4.2 Volts (preferably up to 4.5 Volts) can be performed with a period of rest for at least 12 hours at or close to 0 volts between each cycle, again without affecting the charge capacity of the cell.

Another advantage of the sodium-ion cells of the present invention, particularly in respect of sodium-ion cells that have previously been charged, is that the steps of discharging to from −0.1 to 1 Volts, and the optional maintenance of the cell potential at −0.1 to 1 Volts until all or substantially all of the charge has dissipated (e.g. short circuit, 0% SOC), produces results for reversible capacity and capacity-fade on cycling of the sodium-ion cells which are actually improved in comparison with the results obtained for similar sodium-ion cells that have not undergone these method steps. Such as advantage is highly surprising and completely unpredicted from the prior art.

Typically, the sodium-ion cells of the present invention have i) a negative electrode comprising a negative electrode material and a negative electrode current collector, and ii) a positive electrode comprising a positive electrode material and a positive electrode current collector. Suitable negative electrode materials include amorphous carbon, hard carbon, silicon and any other material, for example alloying metals such as tin, germanium or antimony, whose structure is adapted to allow the insertion/removal of sodium ions during charge/discharge. Advantageously the negative and positive current collectors comprise one or more conductive materials which are stable at from −0.1 to 1 Volts (or within the preferred voltage ranges described above), and/or under conditions of from 0% to 20% charge, preferably from 0% to 10% charge, further preferably from 0% to 5% charge, ideally 0% to 2% charge, and particularly ideally 0% charge, and which do not dissolve or alloy with sodium. Preferably, the one or more conductive materials do not alloy and/or otherwise react with sodium and may be in pure form, impure form, as an alloy or as a mixture, either alone or in combination with varying amounts of one or more other elements. Further preferably at least one of the one or more conductive materials includes a low grade material such as an industrial grade or a household grade material. Advantageously, the one or more conductive materials comprise one or more metals, preferably selected from copper, aluminium and titanium.

Advantageously, the same composition of conductive materials is chosen for both the positive and the negative current collector and the Applicant has observed that when such is the case, the long term storage behaviour at cell voltage of from −0.1 to 1 Volts, or within the preferred voltage ranges described above, and/or when charged from 0% to 20% (or less as defined in the preferred ranges described above) is improved for such sodium-ion cells when re-charged. Further, it is particularly preferred that at least one of the one or more conductive materials for both the positive and the negative current collectors, comprise aluminium, either in pure form, impure form, as an alloy or as a mixture, either alone or in combination with varying amounts of one or more other elements. The Applicant has found that it is surprisingly possible to use low grade aluminium, for example from impure or household sources, as or in the conductive material of one or both current collectors, and this achieves obvious important commercial advantages. Furthermore, at the operating electrode potential the impurities in the low grade aluminium (e.g. zinc or copper) are under cathodic protection and therefore do not dissolve into the electrolyte phase. This is in contrast with the usual requirement for high purity aluminium to be used in the cathode current collectors for lithium-ion and sodium-ion batteries in current use.

Household-grade aluminium (for example sold as "kitchen foil", "tin foil" or "oven foil") includes aluminium material that has an aluminium content from 92 to less than 100%, for example an aluminium content of from 92 to 99%. Impure aluminium may contain less than 92% aluminium.

The present invention therefore provides sodium-ion cells either per se and/or as used in an energy storage device, comprising a negative electrode with one or more negative electrode materials and a negative electrode current collector, and a positive electrode with one or more positive electrode materials and a positive electrode current collector; wherein one or more of the positive and/or negative current collectors comprise a one or more conductive materials which are stable in the range −0.1 to 1 Volts, or in the preferred voltage ranges described above, and which does not dissolve or alloy with sodium.

Preferably, the one or more conductive materials comprise one or more metals either in pure form, in impure form, as an alloy or as a mixture, either alone or in combination with varying amounts of one or more other elements. Particularly preferably, the one or more current collectors comprise one or more metals selected from copper, aluminium and titanium.

The present Applicant has found that the sodium-ion cells of the present invention, either when used per se or as part of an energy storage device, are particularly advantageous when at least one of the positive and negative electrode current collectors, preferably the negative electrode current collector, comprises a carbon coating. This produces benefits such as better adhesion between the active negative electrode material and the negative electrode current collector, which in turn, leads to lower contact resistance. Current collectors that comprise a carbon-coating are also found to improve the rate performance and this enables current to be quickly charged/discharged. Similar advantages are obtained when the sodium-ion cell includes a positive electrode current collector which comprises a carbon coating. A sodium-ion cell that includes a positive current collector comprising a carbon coating in addition to a negative current collector comprising a carbon coating, is especially electrically efficient.

The current collectors that comprise a carbon coating preferably comprise one or more carbon-coated materials which are stable from −0.1 to 1 Volts, and which do not dissolve or alloy with sodium. Preferred carbon-coated materials include carbon-coated metals (the metal may be conductive but it does not need to be conductive per se as the carbon coating will provide conductivity). A carbon coating may be applied to the chosen material (being used to provide the conductive material) using any suitable technique, such as spray coating, solvent casting, dipping etc. Alternatively, suitable carbon coated materials may be commercially available. Carbon coated metals such as carbon coated copper, and/or carbon coated aluminium and/or carbon coated titanium are preferred, and carbon-coated aluminium Grade: SDX supplied by Showa Denko Inc. is particularly preferred. Carbon-coated low grade aluminium (e.g. from impure or household-grade sources) is extremely preferred. As discussed above, carbon-coated low grade aluminium is cheap to produce and the impurities present in the low grade aluminium do not leach or cause any cell performance problems.

The negative and positive electrode materials used in the sodium-ion cells of the present invention are any materials which are able to intercalate and de-intercalate (insert and remove) sodium ions during charging and discharging.

The wording "sodium-ion cell" as used herein is to be interpreted as meaning any electrochemical cell and suitable examples include (but the invention is not limited to these examples) non-aqueous sodium-ion cells, aqueous sodium-ion cells, sodium-air cells and sodium-oxygen cells. Such electrochemical cells may be utilised in any small or large-scale energy storage devices including but not limited to batteries, battery modules, battery packs, electrochemical devices and electrochromic devices. Batteries, battery modules and battery packs typically comprise one or more sodium-ion cells and some or all of these sodium-ion cells may be connected in series.

In addition to the advantages described above, the present invention also provides an opportunity for the simplification of the battery management systems (BMS), which are needed whenever multiple sodium-ion cells are used. The term "battery management systems", in this context and as used herein, also includes management systems for energy storage devices in general. A battery management system is an electronic system that manages a rechargeable battery (cell or battery or energy storage device) by protecting it from operating outside its Safe Operating Area and monitoring the state of the battery (energy storage device) by calculating secondary data, reporting that data, and controlling the environment of the battery (energy storage device) by re-balancing the charges within each of its cells. Since the sodium-ion cells subjected to the process of the present invention are able to be safely discharged to −0.1 to 1 Volts, and optionally maintained at −0.1 to 1 Volts, until all or substantially all of the charge has dissipated (0% to 20%, or less as defined above, remaining), without any detriment to the charge/discharge performance of the cells, there is no need for an associated battery management system to be concerned with monitoring the lower limit of the Safe Operating Area, or to perform measures to even-out the charge at these low levels. The present invention, therefore, provides a method for balancing an energy storage device (for example in a battery) at discharge, wherein the energy storage device contains one or more previously charged sodium-ion cells at discharge, and the method comprises the step of discharging the previously charged sodium-ion cell to −0.1 to 1 Volts, optionally maintaining the cell potential at −0.1 to 1 Volts, until 80% to 100% of the charge has dissipated (preferred ranges of percentages including less than 100% can be calculated directly from the ranges described above). As described above the need for the optional part of the process i.e. maintaining the cell potential at −0.1 to 1 Volts (or less as defined in the ranges described above), will be determined by the speed and/or efficiency of the discharging part of the process.

When the sodium-ion cells are discharged during the process of the present invention, heat energy is released, and particularly in the case where multiple sodium-ion cells are discharged, as in an energy storage device such as a large battery module or battery pack, it is advantageous to capture this heat energy, for example using a heat storage device, a heat exchanger or an ancillary heating device.

In a final aspect, the present invention provides a charged sodium-ion cell which comprises one or more positive and/or negative current collectors that comprise aluminium, particularly low grade aluminium, and which preferably comprise a carbon coating, as described above. This aspect of the invention also provides charged energy storage devices which comprise one or more of such charged sodium-ion cells, and also provides for the use of such charged sodium ion-cells and charged energy storage devices in electrical applications. Preferably, such cells are in a state of charge of from 40% to 100%, preferably from 50% to 80%.

BRIEF DESCRIPTION OF THE DRAWINGS

The present invention will now be described with reference to the following figures in which.

DETAILED DESCRIPTION

Electrochemical Results

A Na-ion electrochemical test cell is constructed as follows:

Generic Procedure to Make a Pouch Cell

The pouch cells used comprise square negative electrodes (4.8 cm$^2$) and square positive electrodes (4.0 cm$^2$) which are separated by a glass fibre (Whatman GF/A grade) soaked in the appropriate Na$^+$ based electrolyte. The cell assembly is then hermetically sealed under vacuum within an Al-laminated pouch material ready for electrochemical testing.

Cell Testing

The cells are tested as follows, using Constant Current Cycling techniques.

The cell is cycled at a given current density between pre-set voltage limits. A commercial battery cycler from Maccor Inc. (Tulsa, Okla., USA) is used. On charge, alkali ions are extracted from the cathode active material. During discharge, alkali ions are re-inserted into the cathode active material.

Carbon coated aluminium materials used as the negative and/or positive current collectors are the SDX™ materials supplied by Showa Denko Inc.

Example 1: Na-Ion Pouch Cells 0V (Short Circuit) with 12 Hour Storage Testing

Square negative electrodes (4.8 cm$^2$) and square positive electrodes are cut (4.0 cm$^2$) from carbon coated aluminium current collector material (SDX™) that has been prior coated with the respective negative and positive electrode materials. These are separated by a glass fibre (Whatman GF/A grade) soaked in the appropriate Na$^+$ based electrolyte. This cell assembly is made ready for electrochemical testing by hermetically sealing it under vacuum within an Al-laminated pouch material.

Figure 1A:
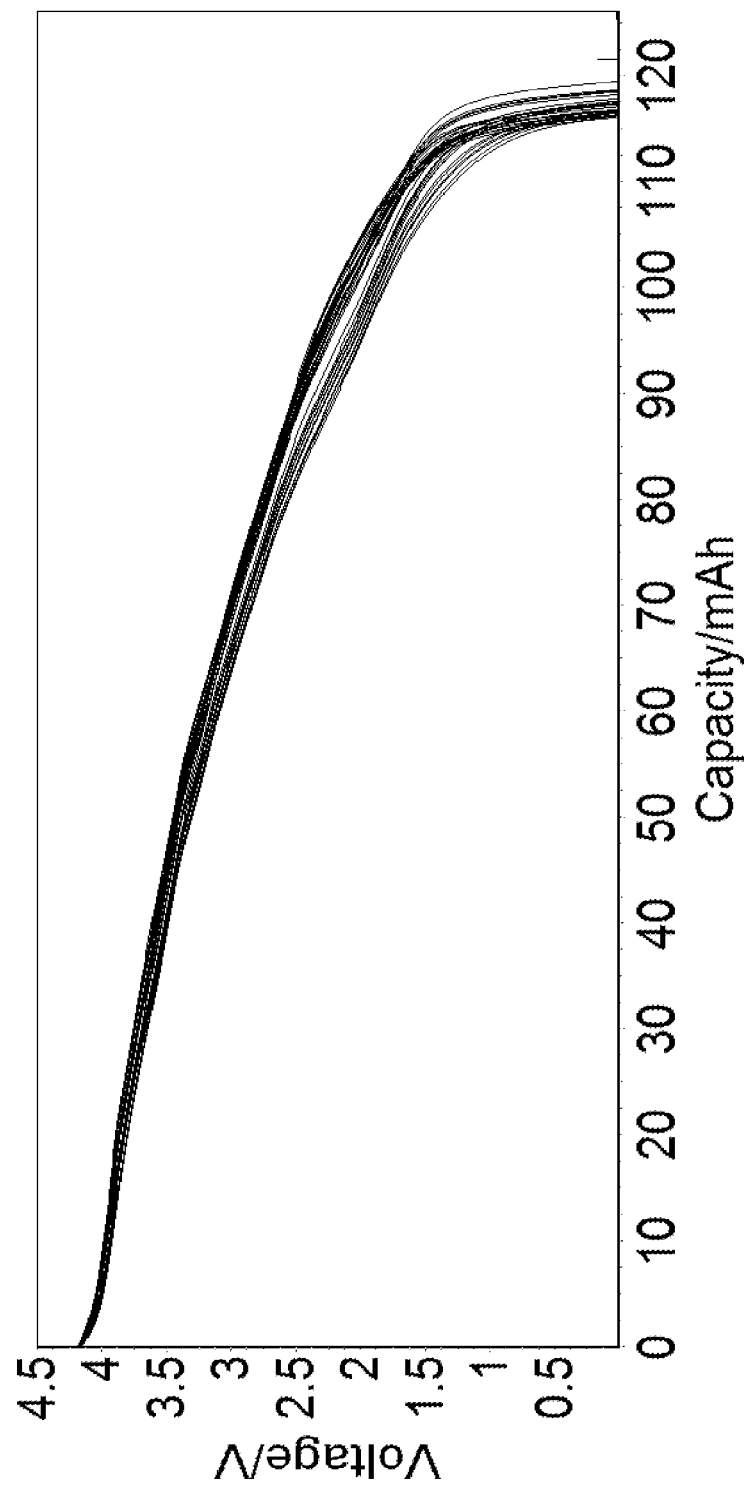
FIG. 1(A) shows the discharge cell voltage profiles for the first 35 charge-discharge cycles for a full Na-ion cell held potentiostatically at 0 Volts for 12 hours after each discharge process, as described in Example 1.
Figure 1B:
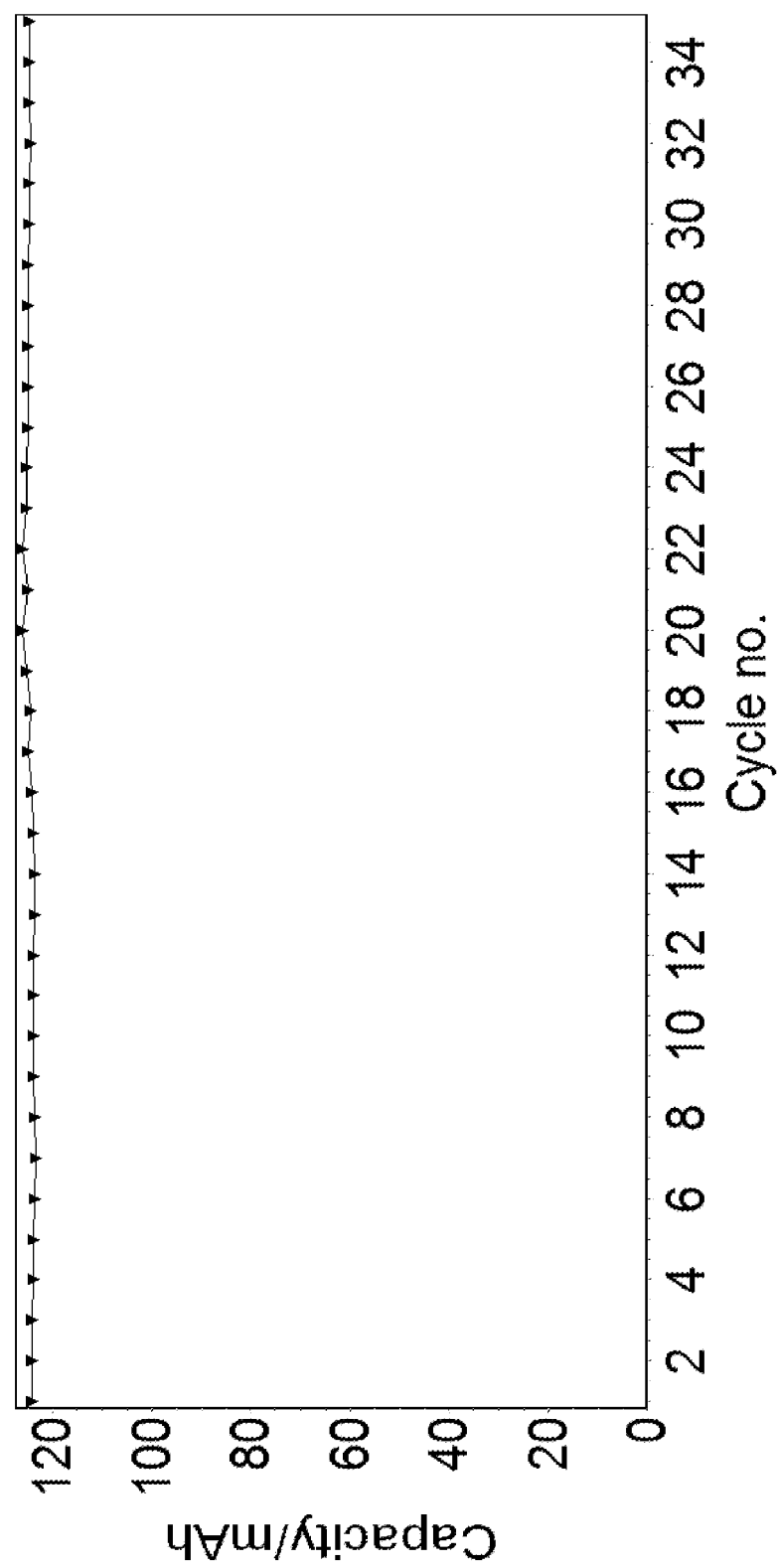
FIG. 1(B) shows the charge and discharge specific capacities for the cathode versus cycle number for the first 35 charge-discharge cycles for a full Na-cell held potentiostatically at 0 Volts for 12 hours after each discharge process, as described in Example 1.

FIGS. 1(A) and 1(B) (Cell #406011) show results from the constant current (±C/10) cycling of a full Na-ion Cell comprising a negative electrode of active material Carbotron P (J) and a positive electrode comprising cathode sample X1868 (composition: $Na_{0.833}Ni_{0.317}Mn_{0.467}Mg_{0.100}Ti_{0.117}O_2$) using a 0.5 M NaPF$_6$—EC/DEC/PC (1:1:1 by volume) electrolyte and GF/A Separator in the voltage range 0.0-4.2 V. At the end of each charge process the cell is held potentiostatically (constant voltage) at 4.2 V until the current drops to 10% of the constant current value. At the end of the constant current discharge process the cell is held potentiostatically (constant voltage) at 0 V for a further 12 h to simulate a short circuit storage period. The testing was undertaken at 30° C.

FIG. 1(A) shows the discharge cell voltage profiles (i.e. cell voltage versus cycle number) for the first 35 charge-discharge cycles. FIG. 1(B) shows the charge and discharge specific capacities for the cathode versus cycle number for the first 35 charge-discharge cycles.

From inspection of FIG. 1(B) it can be seen that the cell cycling behavior is extremely stable. The data show that the capacity fade rate on cycling is extremely low. Clearly the extended short circuit period (12 h at 0V) does not cause any degradation in cell performance. This can be evidenced by the discharge voltage profiles that are essentially co-incident over these first 35 cycles.

Example 2: Na-Ion Pouch Cells 0V (Short Circuit) with 48 Hour Storage Testing

Figure 2A:
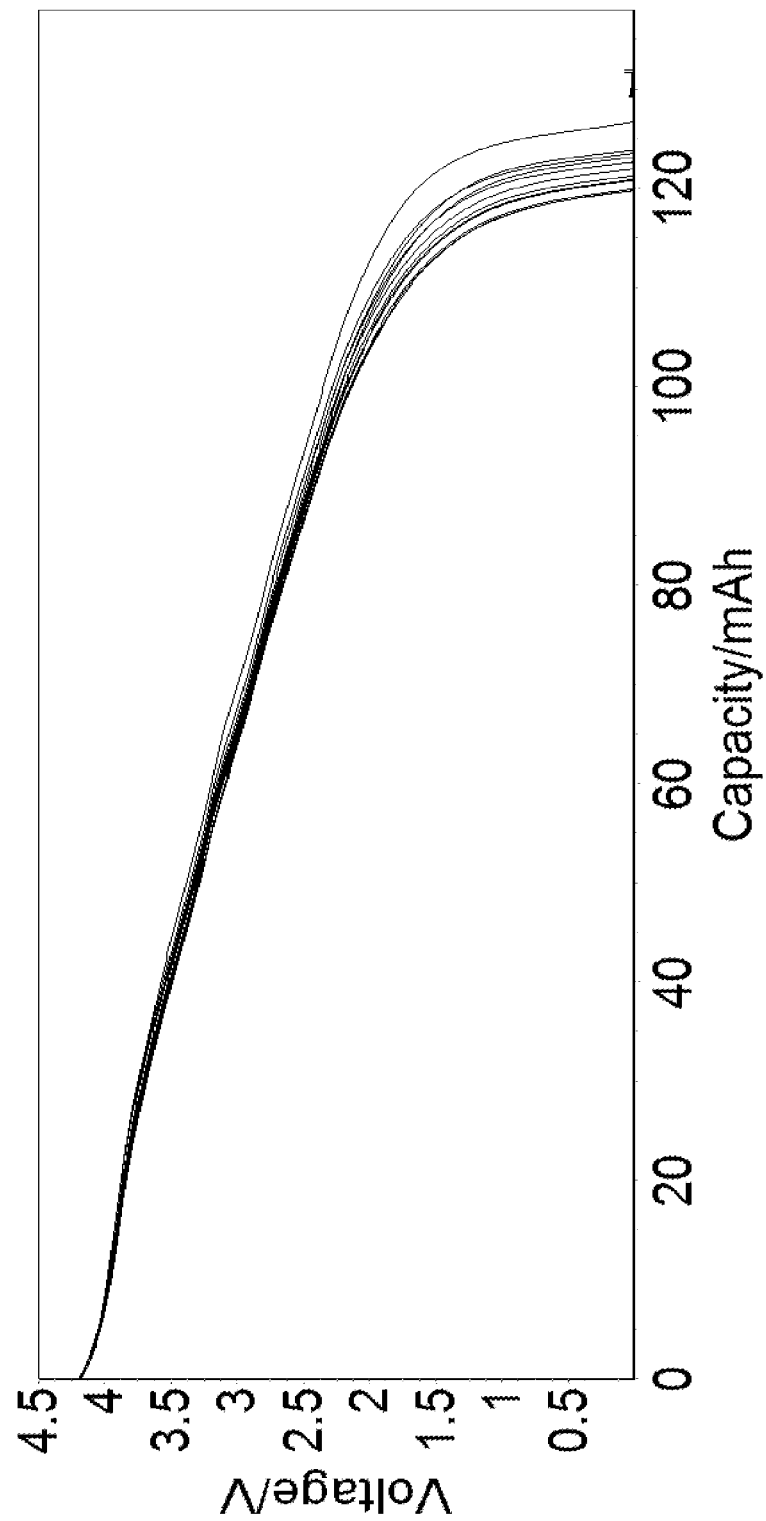
FIG. 2(A) shows the discharge cell voltage profiles for the first 12 charge-discharge cycles for a full Na-ion cell held potentiostatically at 0 Volts for 48 hours after each discharge process, as described in Example 2.

The same composition of Na-ion Pouch Cells as made in Example 1 were stored at 0V for 48 h (short-circuit) to give the following storage testing results:

FIGS. 2(A) and (B) (Cell #407018) show results from the constant current (±C/10) cycling of full Na-ion Cell comprising a negative electrode of active material Carbotron P (J) and a positive electrode comprising cathode sample X1868 (composition: $Na_{0.833}Ni_{0.317}Mn_{0.467}Mg_{0.100}Ti_{0.117}O_2$) using a 0.5 M NaPF$_6$—EC/DEC/PC (1:1:1 by volume) electrolyte and GF/A Separator in the voltage range 0.0-4.2 V. At the end of the charge process the cell is held potentiostatically (constant voltage) at 4.2 V until the current drops to 10% of the constant current value. At the end of the constant current discharge process the cell is held potentiostatically (constant voltage) at 0 V for a further 48 h to simulate a short circuit storage period. The testing was undertaken at 30° C.

Figure 2B:
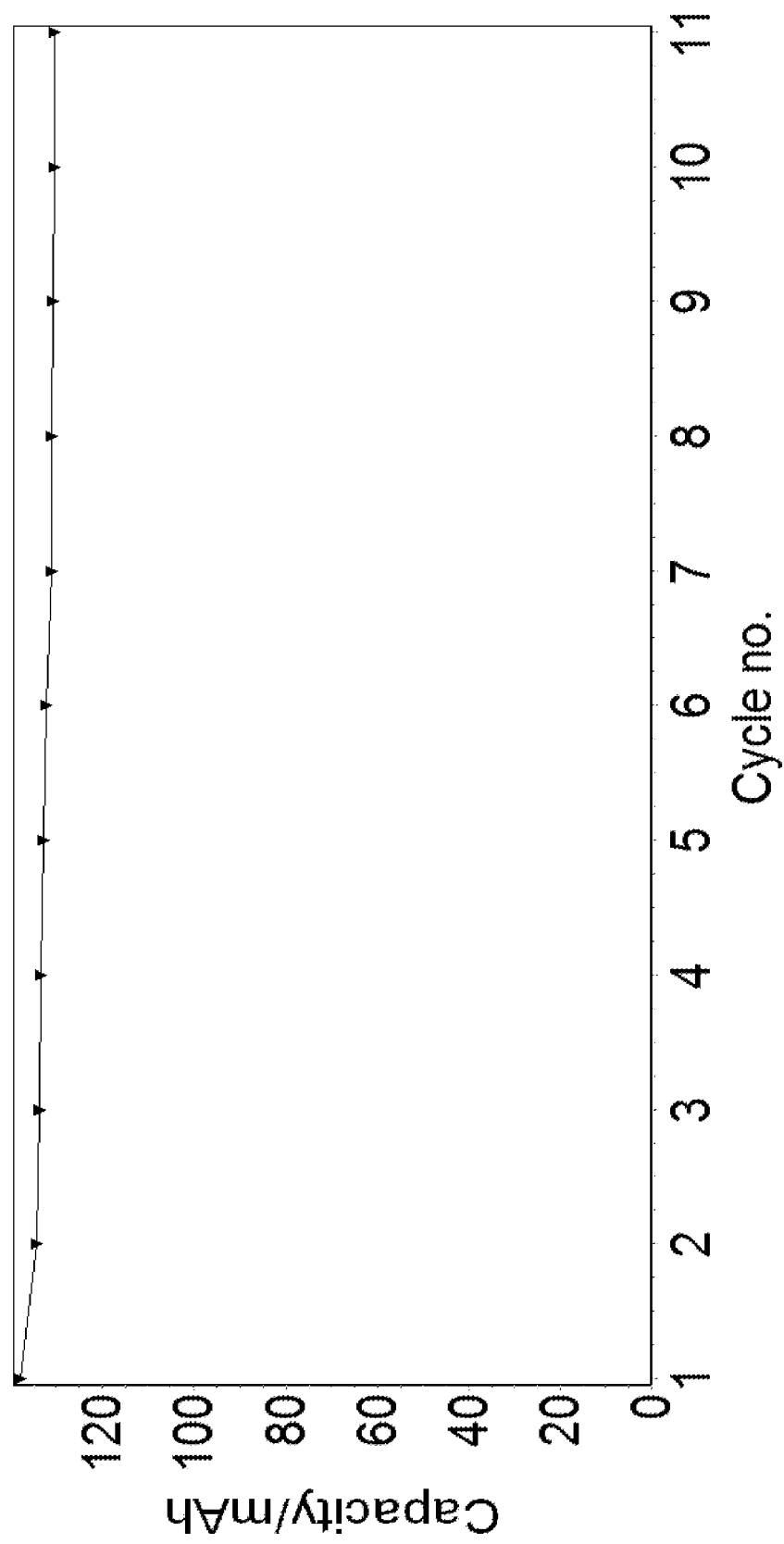
FIG. 2(B) shows the charge and discharge specific capacities for the cathode versus cycle number for the first 12 charge-discharge cycles for a full Na-cell held potentiostatically at 0 Volts for 48 hours after each discharge process, as described in Example 2.

FIG. 2(A) shows the discharge cell voltage profiles (i.e. cell voltage versus cycle number) for the first 12 charge-discharge cycles. FIG. 2(B) shows the charge and discharge specific capacities for the cathode versus cycle number for the first 12 charge-discharge cycles.

From inspection of Figure (B) it can be seen that the cell cycling behavior is extremely stable. The data show that the capacity fade rate on cycling is extremely low. Clearly the extended short circuit period (48 h at 0V) does not cause any degradation in cell performance. This can be evidenced by the discharge voltage profiles that are essentially co-incident over these first 12 cycles.

Example 3: Na-Ion Pouch Cells 0V (Short Circuit) with 96 Hour Storage Testing

Figure 3A:
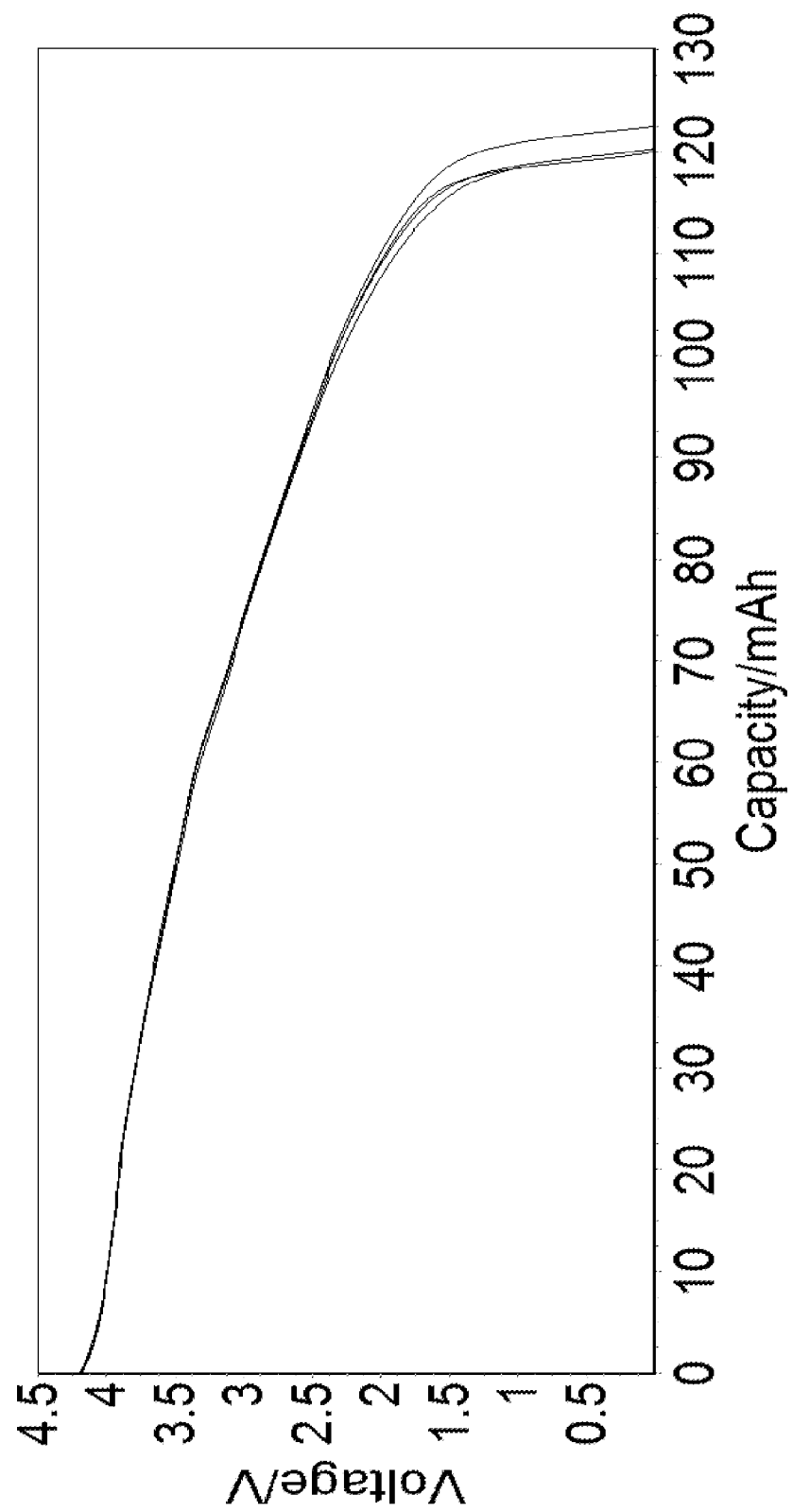
FIG. 3(A) shows the discharge cell voltage profiles for the first 4 charge-discharge cycles for a full Na-ion cell held potentiostatically at 0 Volts for 96 hours after each discharge process, as described in Example 3.
Figure 3B:
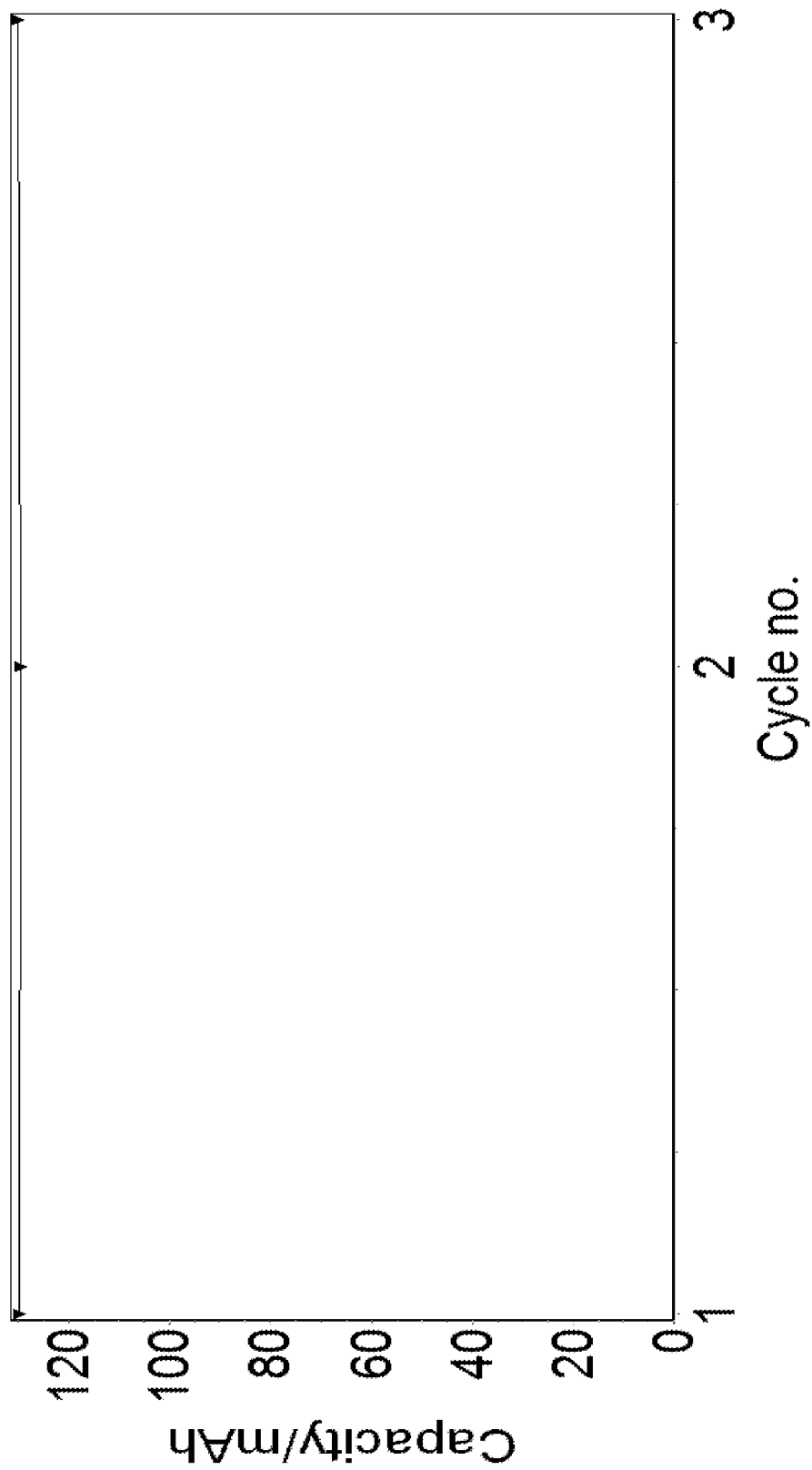
FIG. 3(B) shows the charge and discharge specific capacities for the cathode versus cycle number for the first 3 charge-discharge cycles for a full Na-cell held potentiostatically at 0V for 96 hours after each discharge process, as described in Example 3.

The same composition of Na-ion Pouch Cells as used in Example 1 were tested by storing at 0V for 96 h (short-circuit) to give the following storage testing results:

FIGS. 3(A) and 3(B) (Cell #407017) show results from the constant current (±C/10) cycling of full Na-ion Cell comprising a negative electrode of active material Carbotron P (J) and a positive electrode comprising cathode sample X1868 (composition: $Na_{0.833}Ni_{0.317}Mn_{0.467}Mg_{0.100}Ti_{0.117}O_2$) using a 0.5 M $NaPF_6$—EC/DEC/PC (1:1:1 by volume) electrolyte and GF/A Separator in the voltage range 0.0-4.2 V. At the end of the charge process the cell is held potentiostatically (constant voltage) at 4.2 V until the current drops to 10% of the constant current value. At the end of the constant current discharge process the cell is held potentiostatically (constant voltage) at 0 V for a further 96 h to simulate a short circuit storage period. The testing was undertaken at 30° C.

FIG. 3(A) shows the discharge cell voltage profiles (i.e. cell voltage versus cycle number) for the first 4 charge-discharge cycles. FIG. 3(B) shows the charge and discharge specific capacities for the cathode versus cycle number for the first 3 charge-discharge cycles.

From inspection of FIG. 3 (B) it can be seen that the cell cycling behavior is extremely stable. The data show that the capacity fade rate on cycling is extremely low. Clearly the extended short circuit period (96 h at 0V) does not cause any degradation in cell performance. This can be evidenced by the discharge voltage profiles that are essentially co-incident over these first 3 cycles.

Example 4: Investigating the Use of Household Al as the Negative Current Collector in Na-Ion Pouch Cells This Example uses similar pouch cells to those made for Example 1, except that a low purity, household grade aluminium was used as the negative current collector, in place of the high purity carbon coated aluminium current collector (SDX) used in Examples 1 to 3.

Figure 4A:
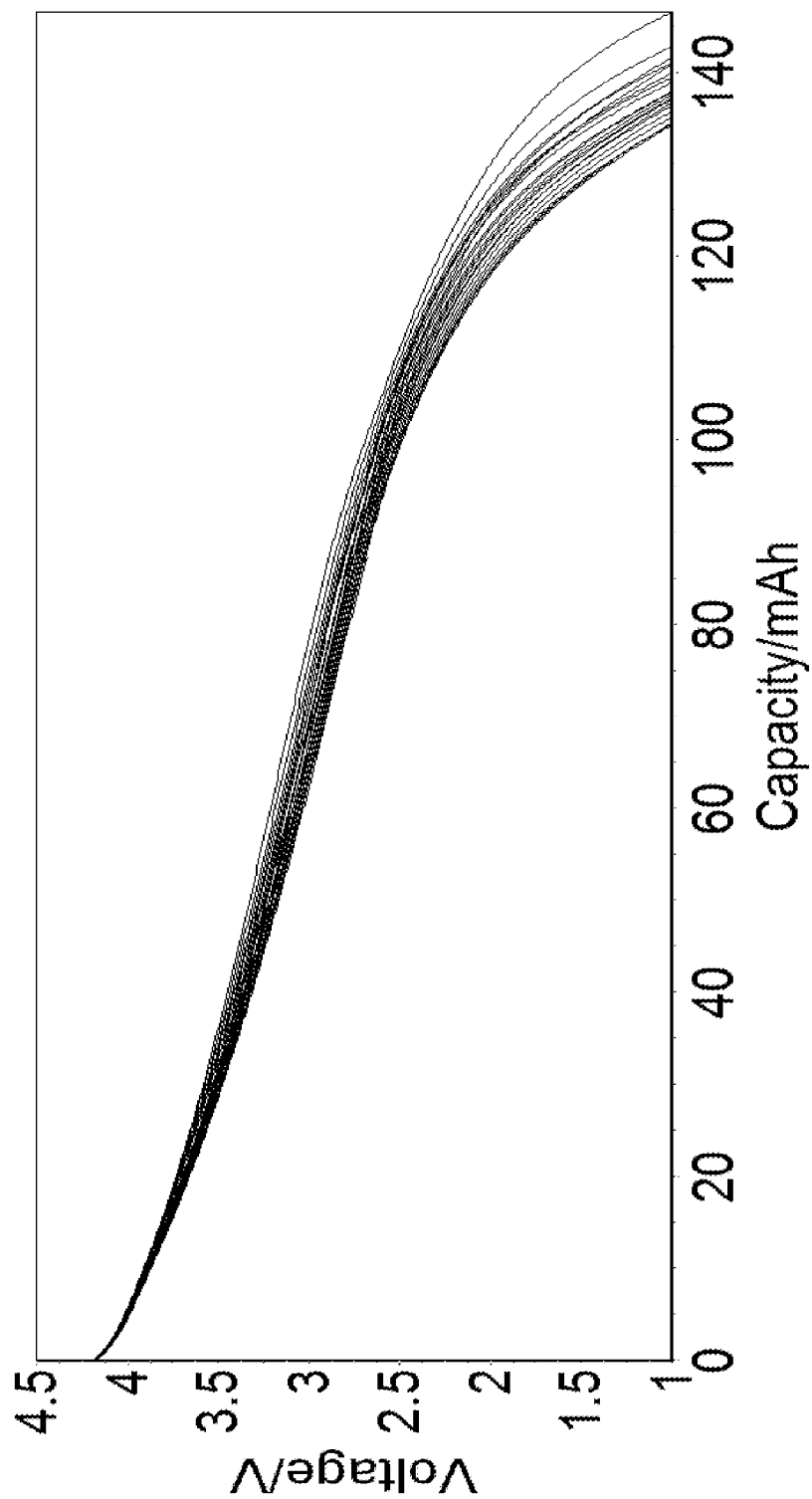
FIG. 4(A) shows the discharge cell voltage profiles for the first 22 charge-discharge cycles for a full Na-ion Cell, using household grade aluminium as the negative current collector, as described in Example 4.
Figure 4B:
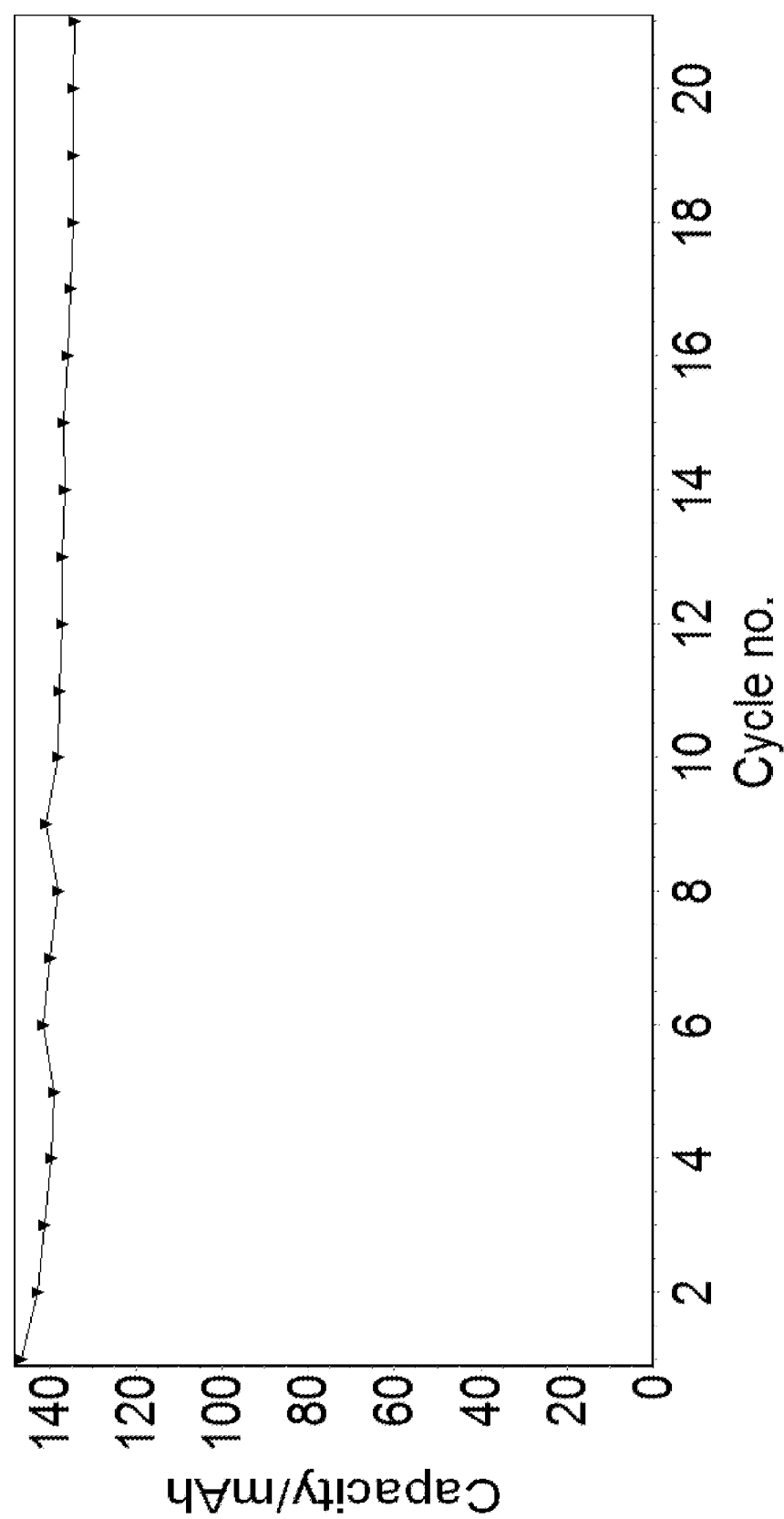
FIG. 4(B) shows the charge and discharge specific capacities for the cathode versus cycle number for the first 22 charge-discharge cycles, for a full Na-ion Cell with household grade aluminium used as the negative current collector, as described in Example 4.

FIGS. 4(A) and 4(B) (Cell #407016) show results from the constant current (±C/10) cycling of full Na-ion Cell comprising a negative electrode of active material Carbotron P (J) and a positive electrode comprising cathode sample X1868 (composition: $Na_{0.833}Ni_{0.317}Mn_{0.467}Mg_{0.100}Ti_{0.117}O_2$) using a 0.5 M $NaPF_6$—EC/DEC/PC (1:1:1 by volume) electrolyte and GF/A Separator in the voltage range 1.0-4.2 V. At the end of the charge process the cell is held potentiostatically (constant voltage) at 4.2 V until the current drops to 10% of the constant current value. The testing was undertaken at 30° C.

FIG. 4(A) shows the discharge cell voltage profiles (i.e. cell voltage versus cycle number) for the first 22 charge-discharge cycles. FIG. 4(B) shows the charge and discharge specific capacities for the cathode versus cycle number for the first 22 charge-discharge cycles.

From inspection of FIGS. 4(A) and 4(B) it can be seen that the cell cycling behavior is extremely stable. The data show that the capacity fade rate on cycling is extremely low. There is no indication in the electrochemical data that there is a problem with the use of the low purity Al current collector on the negative electrode.

The Applicant believes that the reason why low purity aluminium current collectors work is because under normal operation of the Na-ion cells the negative electrode is under very reducing conditions and the operating voltage is close to that of Na metal. At these electrode potentials the impurities in the low grade Al (such as Zn, Cu) are under cathodic protection and therefore do not dissolve into the electrolyte phase.

The invention claimed is:

1. A process for making a full (not half-cell) sodium-ion cell which is capable of safe storage or transportation, comprising constructing a sodium-ion cell comprising a positive electrode, comprising a positive electrode active material, a negative electrode comprising a negative electrode active material and an electrolyte, wherein the negative electrode active material is one or more selected from the group consisting of amorphous carbon, hard carbon, and silicon with an alloying metal, whose structure is adapted to allow the insertion/removal of sodium ions during charge/discharge operations, and further wherein the sodium-ion cell is optionally subjected to one or more charge/discharge operations;

characterised in that the full (not half-cell) sodium-ion cell is treated to produce a full (not half-cell) sodium-ion cell that is in a state of charge of from 0% to 20%, using treatment steps:
in the case of a sodium-ion cell that has not been subjected to the optional one more charge/discharge operations, maintaining the sodium-ion cell in its pristine as made and fully uncharged state and maintaining the cell potential in the range −0.1 to 1 Volts for at least 8 hours;
in the case of a sodium-ion cell that has been subjected to the optional one or more charge/discharge operations, discharging the charged/discharged sodium-ion cell in the range −0.1 to 1 Volts and maintaining the cell potential in the range −0.1 to 1 Volts for at least 8 hours.

2. A full (not half-cell) sodium-ion cell made by the process according to claim 1, further comprising a removable shorting device.

3. The full (not half-cell) sodium-ion cell according to claim 2 wherein at least a portion of the removable shorting device is external to the sodium-ion cell.

4. The full (not half-cell) sodium-ion cell according to claim 2 wherein the removable shorting device is not physically removable from the sodium-ion cell.

5. The full (not half-cell) sodium ion cell according to claim 2 wherein the removable shorting device comprises a low impedance or low resistance short between the positive and negative electrodes in the sodium-ion cell.

6. A full (not half-cell) sodium-ion cell made by the process according to claim 1 further comprising a negative and a positive electrode current collector, wherein each electrode current collector comprises one or more materials selected from any conductive material that is stable when the sodium-ion cell potential is at −0.1 to 1 Volts, or is in a state of charge of from 0% to 20%, and which does not dissolve or alloy with sodium; and optionally wherein the sodium-ion comprises a removable shorting device.

7. The full (not half-cell) sodium-ion cell according to claim 6 wherein the conductive material comprises one or more metals which may be in pure form, in impure form, as an alloy or as a mixture, either alone or in combination with varying amounts of one or more other elements, and optionally wherein the conductive material comprises a carbon coating.

8. The full (not half-cell) sodium-ion cell according to claim 7 wherein the negative or positive electrode current collector comprises aluminium, and wherein at least a portion of the aluminium comprises impure or household-grade aluminium.

9. The storage or transportation of a full (not half-cell) sodium-ion cell, made according to the process of claim 1.

10. An energy storage device comprising one or more full (not half-cell) sodium-ion cells made according to the process of claim 1.

11. An energy storage device comprising one or more full (not half-cell) sodium-ion cells according to claim 2.

12. A method of balancing an energy storage device at discharge, wherein each of two or more full (not half-cell) sodium-ion cells comprise a positive electrode comprising a positive electrode active material, a negative electrode comprising a negative electrode active material and an electrolyte, wherein the negative electrode active material is one or more selected from the group consisting of amorphous carbon, hard carbon, and silicon with an alloying metal, whose structure is adapted to allow the insertion/removal of sodium ions during charge/discharge operations, wherein the energy storage device contains two or more previously charged sodium-ion cells at discharge, and the method comprises the step of discharging the one or more previously charged sodium-ion cell to −0.1 to 1 Volts, and maintaining the cell potential in the range −0.1 to 1 Volts, until 80 to 100% of the charge has dissipated, for at least 8 hours.

13. A process for making a full (not half-cell) sodium-ion cell which is capable of safe storage or transportation, comprising constructing a sodium-ion cell with a positive electrode comprising a positive electrode material and a positive electrode current collector, a negative electrode comprising a negative electrode material and a negative electrode current collector, and an electrolyte, wherein each electrode current collector comprises one or more materials selected from any conductive material that is stable when the sodium-ion cell potential is at −0.1 to 1 Volts, or is in a state of charge of from 0% to 20%, and which does not dissolve or alloy with sodium; further wherein the sodium-ion cell is optionally subjected to one or more charge/discharge operations;

characterised in that the sodium-ion cell is treated to produce a sodium-ion cell that is in a state of charge of from 0% to 20%, using treatment steps:
in the case of a sodium-ion cell that has not been subjected to the optional one more charge/discharge operations, maintaining the sodium-ion cell in its pristine as made and fully uncharged state and maintaining the cell potential in the range −0.1 to 1 Volts for at least 8 hours;
in the case of a sodium-ion cell that has been subjected to the optional one or more charge/discharge operations, discharging the charged/discharged sodium-ion cell in the range −0.1 to 1 Volts; and maintaining the cell potential in the range −0.1 to 1 Volts for at least 8 hours.

* * * * *